(12) United States Patent
Oki

(10) Patent No.: US 7,426,294 B2
(45) Date of Patent: Sep. 16, 2008

(54) IMAGE PROCESSING APPARATUS AND ITS METHOD

(75) Inventor: Joji Oki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 932 days.

(21) Appl. No.: 10/779,688

(22) Filed: Feb. 18, 2004

(65) Prior Publication Data
US 2004/0160619 A1 Aug. 19, 2004

(30) Foreign Application Priority Data
Feb. 19, 2003 (JP) ............................. 2003-041543

(51) Int. Cl.
*G06K 9/00* (2006.01)
(52) U.S. Cl. ..................... 382/162; 382/166; 382/167
(58) Field of Classification Search ................. 382/162, 382/166, 167; 345/42, 606, 604; 347/19; 358/500
See application file for complete search history.

(56) References Cited

U.S. PATENT DOCUMENTS 6,024,431 A * 2/2000 Takahashi et al. ............. 347/19

7,113,152 B2 * 9/2006 Ben-David et al. ............ 345/32

FOREIGN PATENT DOCUMENTS

| JP | 4-204871 | 7/1992 |
| JP | 8-056292 | 2/1996 |
| JP | 10-264416 | 10/1998 |
| JP | 2002-301813 | 10/2002 |

* cited by examiner

*Primary Examiner*—Anh Hong Do
(74) *Attorney, Agent, or Firm*—Fitzpatrick, Cella, Harper & Scinto

(57) ABSTRACT

Color converters are often implemented as hardware due to being required to perform high-speed processing; however, the scale of hardware of a color converter that corresponds to five or more colors becomes large and its cost rises. Since acquisition of a color converter that corresponds to four colors is easy, it is desirable to provide for the handling of five or more colors effectively using a four-color color converter. Thereby, when converting RGB image data into CMYKLcLm image data, a color converter, which almost simultaneously color-converts RGB into CMYK, executes RGB to LcLm color conversion and then executes RGB to CMYK color conversion. Then, the color conversion result is held in memory and CMYKLcLm image data is generated.

8 Claims, 11 Drawing Sheets

IMAGE PROCESSING APPARATUS AND ITS METHOD

FIELD OF THE INVENTION

This invention relates to an image processing apparatus and its method, and more particularly to image processing using color components of five or more colors.

BACKGROUND OF THE INVENTION

With the progress of electronic photograph type image forming apparatuses, image forming apparatuses with higher performance are needed, and image forming handling five or more colors instead of conventional image forming using four colors has been proposed. There are various methods, such as a method that adds special colors, i.e., red, blue and green, or gold, silver and fluorescence colors, to the standard four colors: cyan (C), magenta (M), yellow (Y) and black (K), or a method that adds light cyan (Lc) and light magenta (Lm), which is general in inkjet methods. However, the purpose is to differentiate image characteristics to be generated.

There are various types in image forming apparatuses handling more colors. For example, in the case of image forming apparatuses using developing agents (toner or powder ink) of six colors, there are generally an image forming apparatus using six image holders (photoconductors) that corresponds to each color toner shown in FIG. 1 and an image forming apparatus using one photoconductor shown in FIG. 2. In addition, there is also an image forming apparatus using two photoconductors, which is described in Japanese Patent Laid-Open No. 4-204871, shown in FIG. 3.

In the apparatus shown in FIG. 1, image forming parts Sa-Sf, in which six photoconductors 1a-1f and developing devices 41-46 filled with developing agents having different spectral characteristics are made to correspond respectively, are placed along the conveyance path of a middle transfer belt 5. This method is a productivity-oriented approach in which degradation of an image output rate is suppressed as much as possible for four-color image formation.

On the other hand, the apparatus shown in FIG. 2 has a structure, in which a photoconductor 1 is combined with six developing devices 41-46, and an arbitrary developing device is selectively moved to a position opposite the photoconductor 1 by rotating a rotary 4 mounted with the developing devices 41-46, to sequentially develop latent images. Therefore, a toner image is transferred on the middle transfer belt 5 for every color to perform multiplex transfer of toner images of six colors, and then the toner images of six-colors formed on the middle transfer belt 5 are transferred on a recording paper. According to this method, an image formed with six-color toner can be outputted while still suppressing the volume of an apparatus to the minimum.

In addition, the apparatus shown in FIG. 3 is a compromise between the apparatuses shown in FIGS. 1 and 2. That is, the apparatus has two image forming parts: an image forming part Sa that includes a photosensitive drum 1a and a second image forming part Sb that includes a photosensitive drum 1b. The image forming parts Sa and Sb have three developing devices 41-43 or 44-46, respectively.

As will be described below in detail, a structure of the control unit of an apparatus that uses color components of five or more colors is almost the same as that that uses color components of four colors in the range of RGB data. However, above a structure, in which RGB data is color-converted into image forming colors (i.e., YMCK, and Lc and Lm), a five-or-more-colors-capable structure is required to handle five or more colors.

In such a structure, especially, a color converter is required to perform high speed processing, so that it is may often be implemented as hardware. However, the scale of hardware for a five-or-more-colors-capable color converter may be large, so that the cost rises. In addition, a four-colors-capable color converter is easily available, so that it is desirable to support five or more colors effectively using the four-color color converter.

SUMMARY OF THE INVENTION

It is an object of this invention to solve the above-described problems individually or collectively and correspond to image forming of five or more colors using a color converter of four colors.

Under this purpose, an image processing apparatus for converting image data composed of three-color components into image data composed of five or more color components. The apparatus comprises a converter, arranged to color-convert the three-color components into four-color components at the same time, and a controller, arranged to allow the converter to perform continuous color conversions to generate image data of five or more color components and hold its color conversion result in memory, in a preferred embodiment. In addition, an image processing apparatus for converting an image signal of three-color components into an image signal of five or more color components comprises a converter arrange to convert the three-color components into color components corresponding to a part of developing agents of a printer, and then convert the image signal of three-color components into color components rather than the part of the developing agents.

Other features and advantages of the present invention will be apparent from the following descriptions taken in conjunction with the accompanying drawings, in which like reference characters designate the same or similar parts throughout the figures thereof.

DETAILED DESCRIPTION OF THE PREFERRED EMBODIMENTS

Hereinafter, a structure of an apparatus using toner of five or more colors will be explained. However, before explaining it, a structure of an apparatus using four-color toner will be explained.

[Structure of Image Forming Apparatus]

Apparatus using four-color toner

Figure 1:
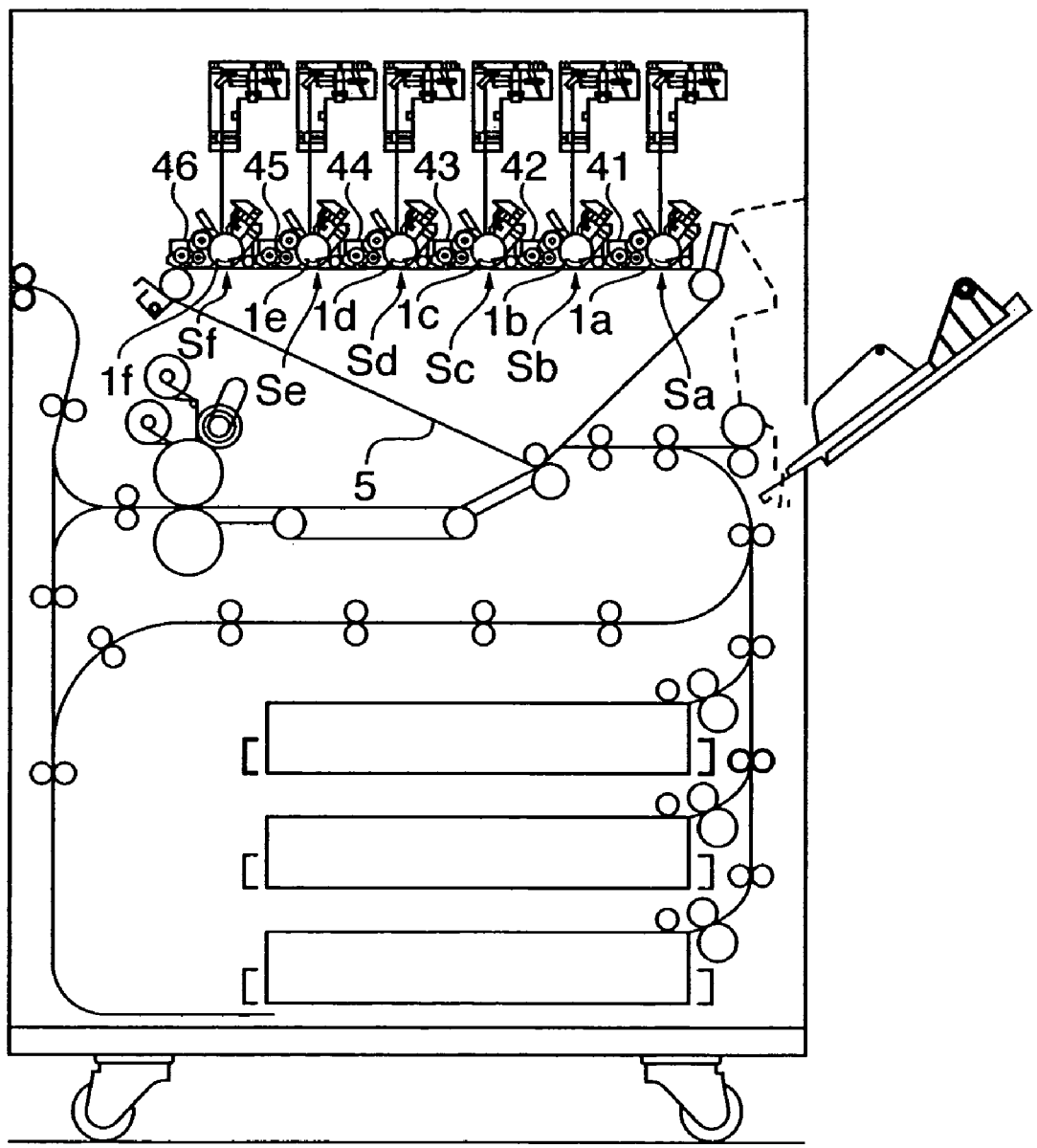
FIGS. 1 to 3 show embodiments of image forming apparatuses in which the number of colors is increased.
Figure 2:
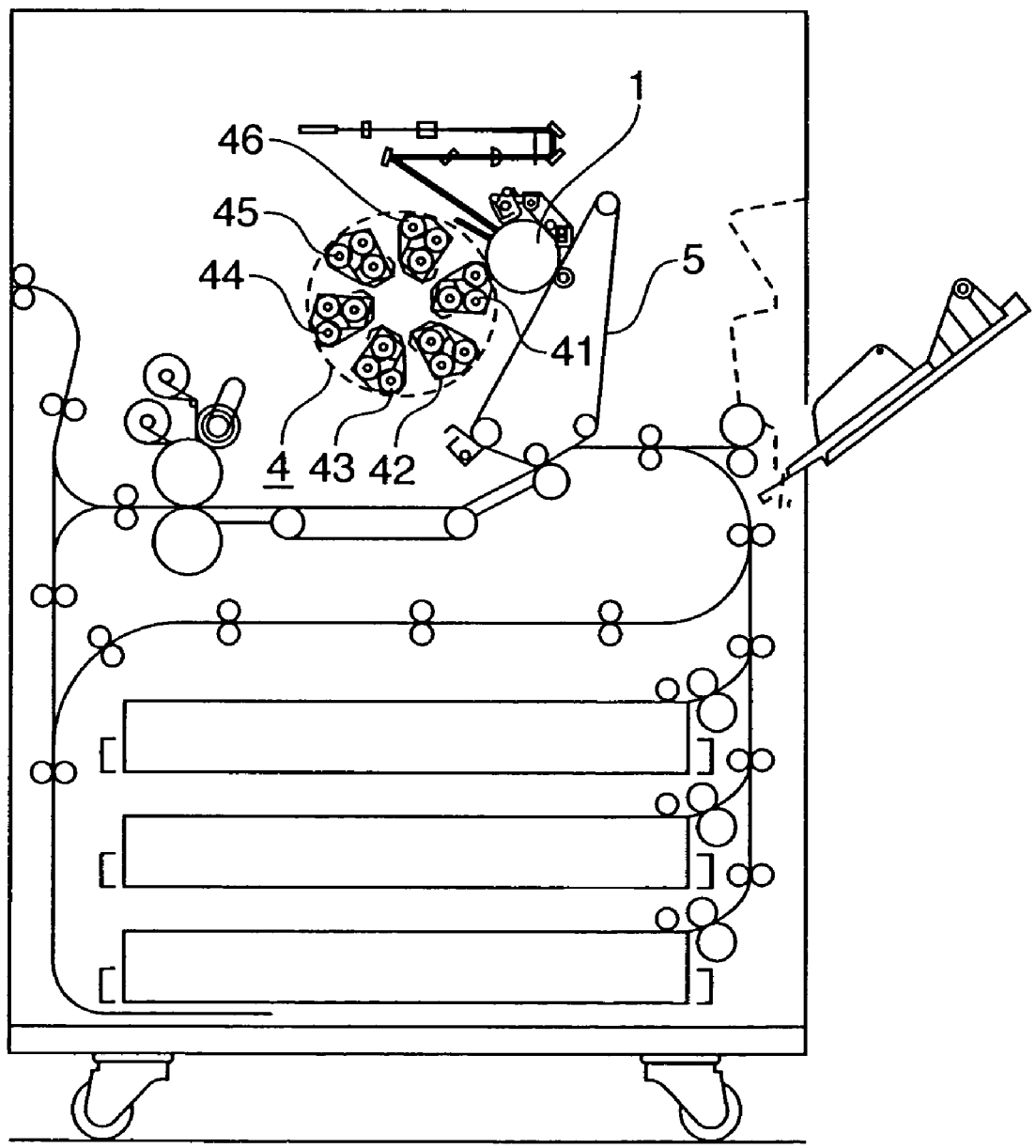
Figure 4:
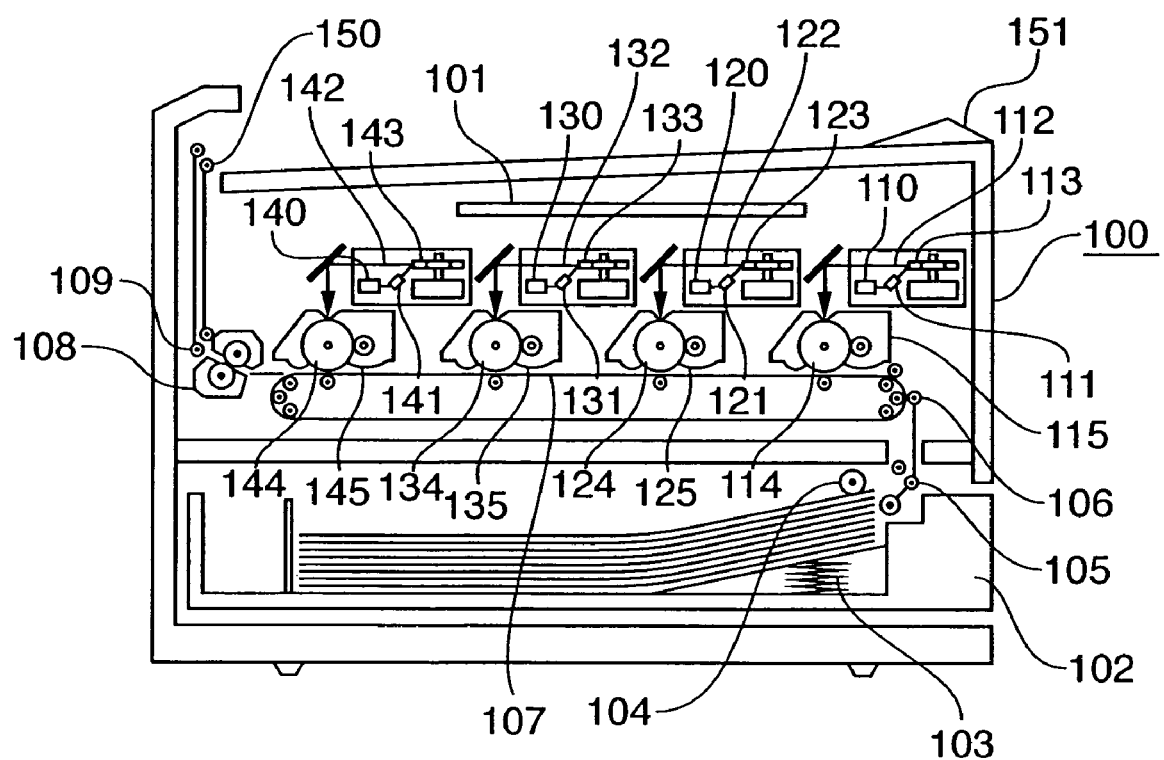
FIG. 4 shows a structure of a laser beam printer using four-color toner.
Figure 5:
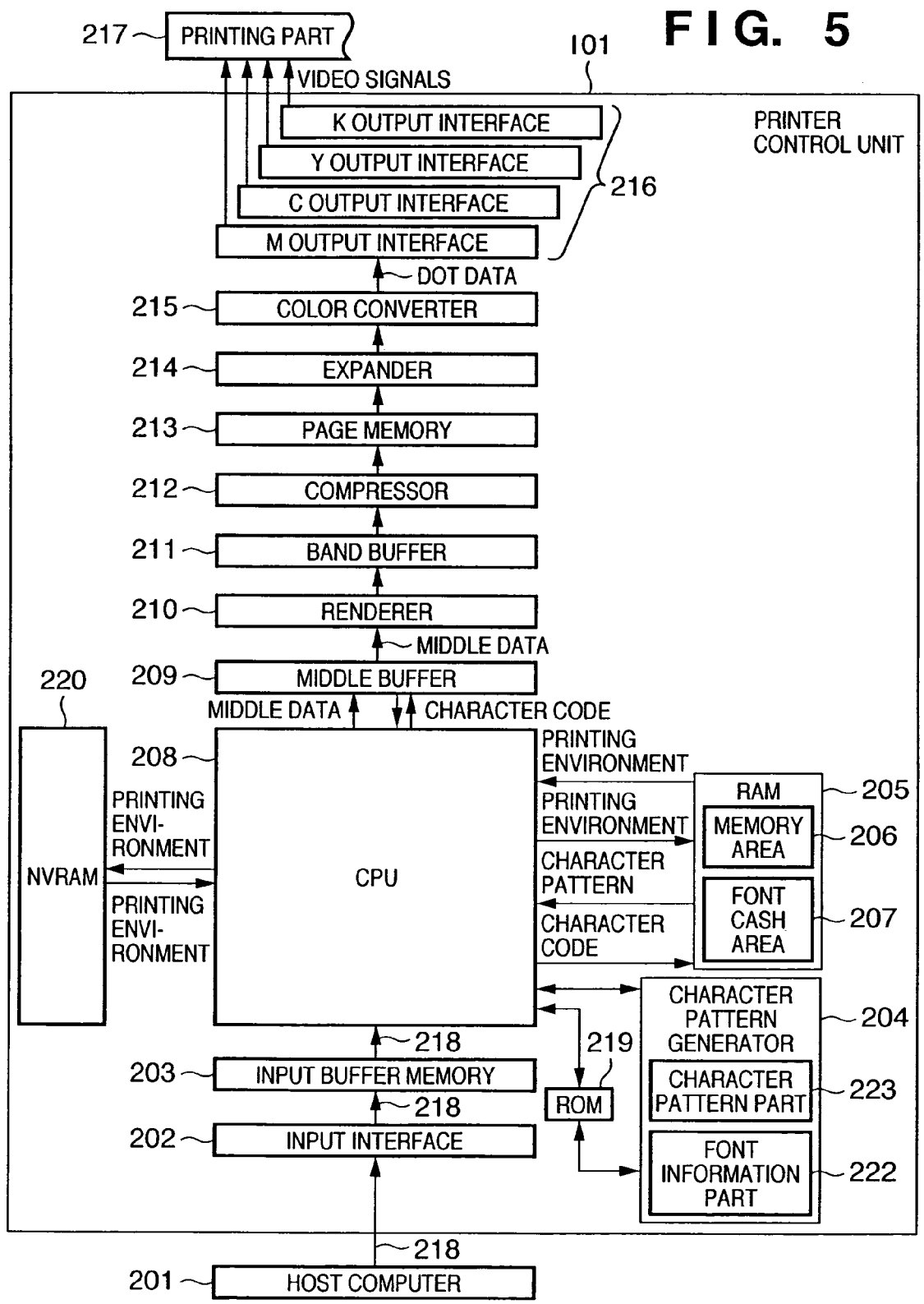
FIG. 5 is a block diagram to show a structure of the control part of a printer.

FIG. 4 shows a structure of a laser beam printer using four-color toner, and FIG. 5 is a block diagram to show a structure of the control part of a printer 100 shown in FIG. 1.

The printer 100 follows character printing commands, various figure rendering commands, image rendering commands and color specification commands transmitted from an external host computer 201, and renders corresponding character patterns, figures and photo-images (images) to form images on recording papers.

Switches to operate the printer 100, an LED display device and an LCD display device to display states of the printer 100, and other devices are placed on an operation panel 151.

A printer control unit 101 analyzes control for the whole of the printer 100 and the above-described commands transmitted from the host computer 201. The printer 100 converts RGB color information into the color information of M (magenta), C (cyan), Y (yellow) and K (black), and has an image formation and development mechanism for every MCYK for image forming and developing each color component image in parallel based on the information. Therefore, the printer control unit 101 generates a printing image for every MCYK and converts it into a video signal to output the video signal to a laser driver for every MCYK.

A laser driver 110 for magenta is a circuit to drive a semiconductor laser element 111, and turns on/off a laser light 112 outputted from the semiconductor laser element 111 corresponding to an inputted video signal. The laser light 112 is operated in the right and left directions by a rotating polygon mirror 113, and scans on a photosensitive drum 114 to form an electrostatic latent image, which consists of character and figure patterns, on the photosensitive drum 114. The latent image is developed by a developing unit (a toner cartridge) 115 placed around the photosensitive drum 114, and then a toner image is formed. The formed toner image is transferred on a recording paper.

Although detailed explanation is omitted, the printer 100 has the same image forming and development mechanism for cyan, yellow and black as magenta, and has image forming parts for the number of toner colors. It is needless to mention that an apparatus using toner of five or more colors has five or more image forming parts. In addition, in the case of a structure of two photosensitive drums shown in FIG. 3, just two image forming parts are enough for an apparatus using toner of five or more colors.

Recording papers are contained in a paper feed cassette 102 equipped in the printer 100, and the top end is held at a constant height by a spring 103. The recording papers are taken in an image forming part by a paper feed roller 104 and conveyance rollers 105 and 106, and passed each of the image forming and development mechanisms of MCYK by a conveyance roller 107, so that each of toner images of MCYK is multi-transferred. The toner image transferred on a recording paper is fixed by heat and pressure of a fixing device 108. Subsequently, the recording paper is discharged outside of the printer 100 by conveyance rollers 109 and 150.

The printer control part 101 inputs data 218, which includes a rendering command and color information for every character, figure and image transmitted from the host computer 201 that is a generation source of printing information, and controls the printer 100 so that it prints out documents per page.

An input interface 202 transmits or receives various information to or from the host computer 201, and an input buffer 203 temporarily stores various information inputted through the input interface 202.

A character pattern generator 204 is composed of a font information part 222, which stores attributes, such as width and height of characters, and addresses of character patterns, a character pattern part 223, which stores character patterns, and control programs, which read out the above-described information. The read-out control programs are stored in a ROM 219, and also have a code conversion function, which calculates the address of a character pattern corresponding to a character code when the code is inputted.

A RAM 205 has a font cash area 207, which stores character patterns outputted from the character pattern generator 204, and a storage area 206, which stores external fonts transmitted from the host computer 201, form information and current printing environment. Information developed into character patterns are once stored in the font cash area 207, so that it is not necessary to develop the same character pattern when it is required and the time to acquire character patterns can be shortened.

A CPU 208 is a CPU that controls the whole of the control system of the printer 100, and controls the whole of the apparatus with control programs stored in the ROM 219.

A middle buffer 209 contains internal data sets generated based on the data 218 read out from the input buffer 203. That is, after receiving the data 218 for one page, the data 218 is converted into simple middle data by the CPU 208 and then stored in the middle buffer 209. After that, the middle data is rendered by a renderer 210 several lines at a time, and then it is stored in a band buffer 211 as a printing image.

The renderer 210 generates an RGB 8 bits/pixel rendered bitmap image per several lines, and at the same time, can generate a 4 bits/pixel attribute bitmap image. The attribute bitmap image is composed of 3 bits/pixel information, which indicates that each pixel constitutes either of character, figure and image, and 1 bit/pixel information, which indicates whether printing is performed using only K if R=G=B or using colors mixed with YMCK.

The band buffer 211 can store an RGB rendering bitmap image and an attribute bitmap image for at least eight lines.

A compressor 212 reads out and compresses an image per several lines from the band buffer 211, and then stores the compressed image in a page memory 213. In this case, the rendering bitmap image and the attribute bitmap image are independently compressed.

After rendering of the middle data for one page is completed and the rendered image is stored in the page memory 213, an expander 214 reads out the compressed image per several lines from the page memory 213 and then expands it. In this case, the rendering bitmap image and the attribute bitmap image are independently read out and then expanded.

A color converter 215 converts the expanded RGB 8 bits/pixel bitmap image into a YMCK 4 bits/pixel bitmap image. In detail, the RGB 8 bits/pixel bitmap image is converted into a YMCK 10 bits/pixel bitmap image, and then gamma compensation is performed on the YMCK 10 bits/pixel bitmap image. After gamma compensation, half-toning processing is performed on the bitmap image to acquire a YMCK 4 bits / pixel bitmap image.

The color converter 215 switches color conversion methods corresponding to pixel values of an attribute bitmap image. Specifically, color conversion methods are switched based on 1 bit/pixel information, which indicates whether printing is performed with only K or colors mixed with YMCK, and then an RGB 8 bits/pixel bitmap image is converter into a YMCK 10 bits/pixel bitmap image. Subsequently, half-toning processing is switched based on 3 bits/pixel information, which indicates that each pixel constitutes either of character, figure and image, and then the YMCK 10 bits/pixel bitmap image is converter into a YMCK 4 bits/pixel bitmap image.

An output interface 216 converts the bitmap image inputted from the color converter 215 into video signals to output them to a printing part 217. The printing part 217 is the printing mechanism part of a page printer to print an image based on video signals inputted from the output interface 216.

As described above, the printer 100 performs image formation and development of MCYK in parallel, so that the output interface 216 is composed of four interfaces, for M, C, Y and K. Each of the four interfaces acquires the bitmap image from the color converter 215 independently, and then converts it into a video signal to output the video signal to a laser driver 110, 120, 130 or 140 for each color plane.

In addition, a non-volatile memory 220 (hereafter, it is called as NVRAM) including EEPROM stores information (panel setting values) set through the operation panel 151.

Figure 6:
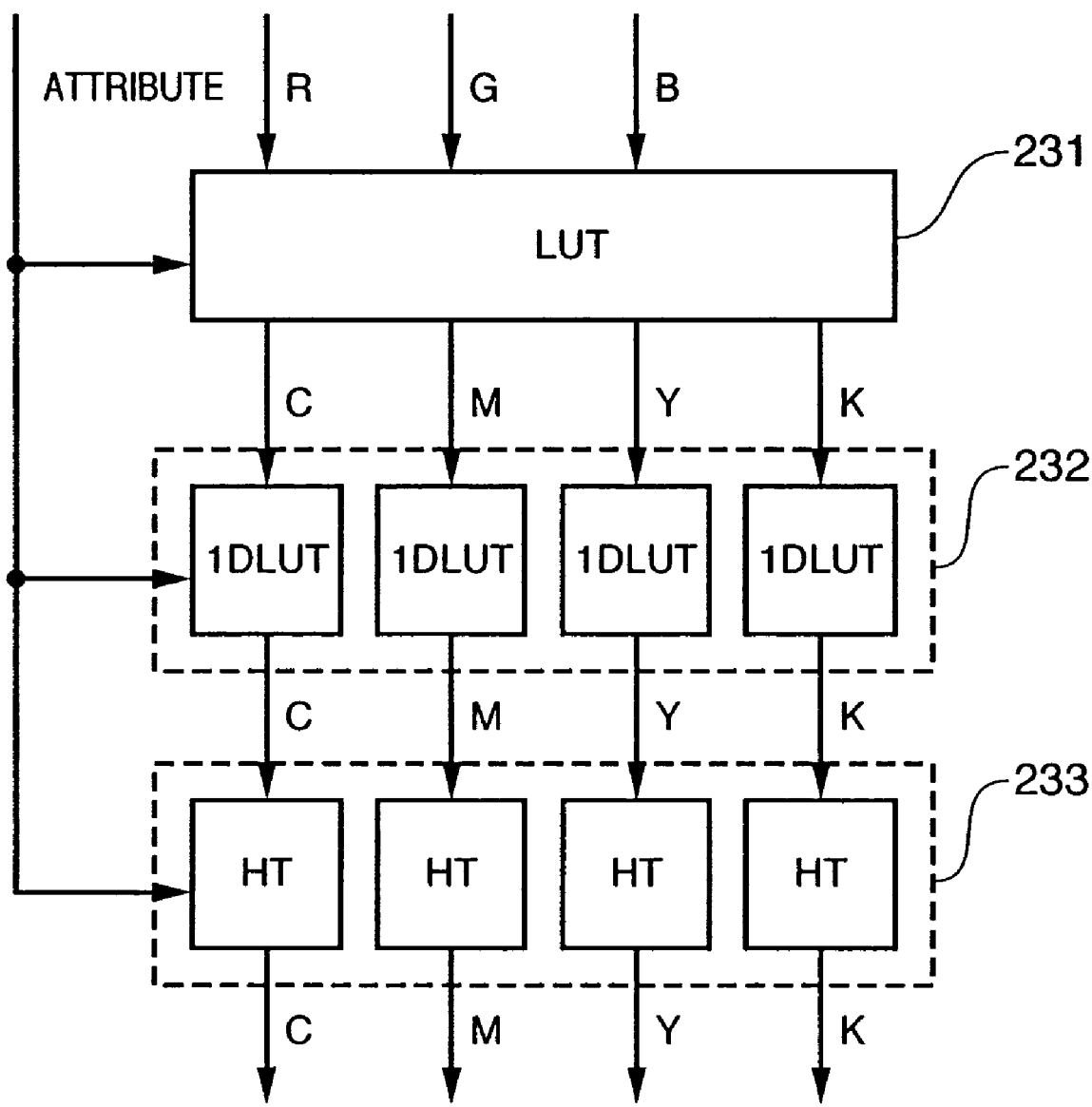
FIG. 6 is a block diagram to show a structure of a color converter.

FIG. 6 is a block diagram to show a structure of the color converter 215.

The color converter 215 is composed of a three-input and four-output lookup table (LUT) 231 for color conversion, a one-input and one-output LUT 232 for gamma compensation and an LUT (HT) 233 for half-toning processing, and inputs an RGB bitmap image and then outputs a CMYK bitmap image per pixel. These LUTs can be switched according to pixel values of an attribute bitmap image. The LUT 231 is provided with two kinds, and the LUT 232 and the HT 233 are provided with three kinds for every color of CMYK.

Apparatus using toner of five or more colors

A structure of the printer control unit 101 of an apparatus using toner of five or more color is almost the same as that shown in FIG. 5 in the range of handling RGB data. However, the color converter 215 thereafter, that is, the color converter 215, the output interface 216 and the printing part 217 must be provided with a structure corresponding to five or more colors to handle them.

Figure 7:
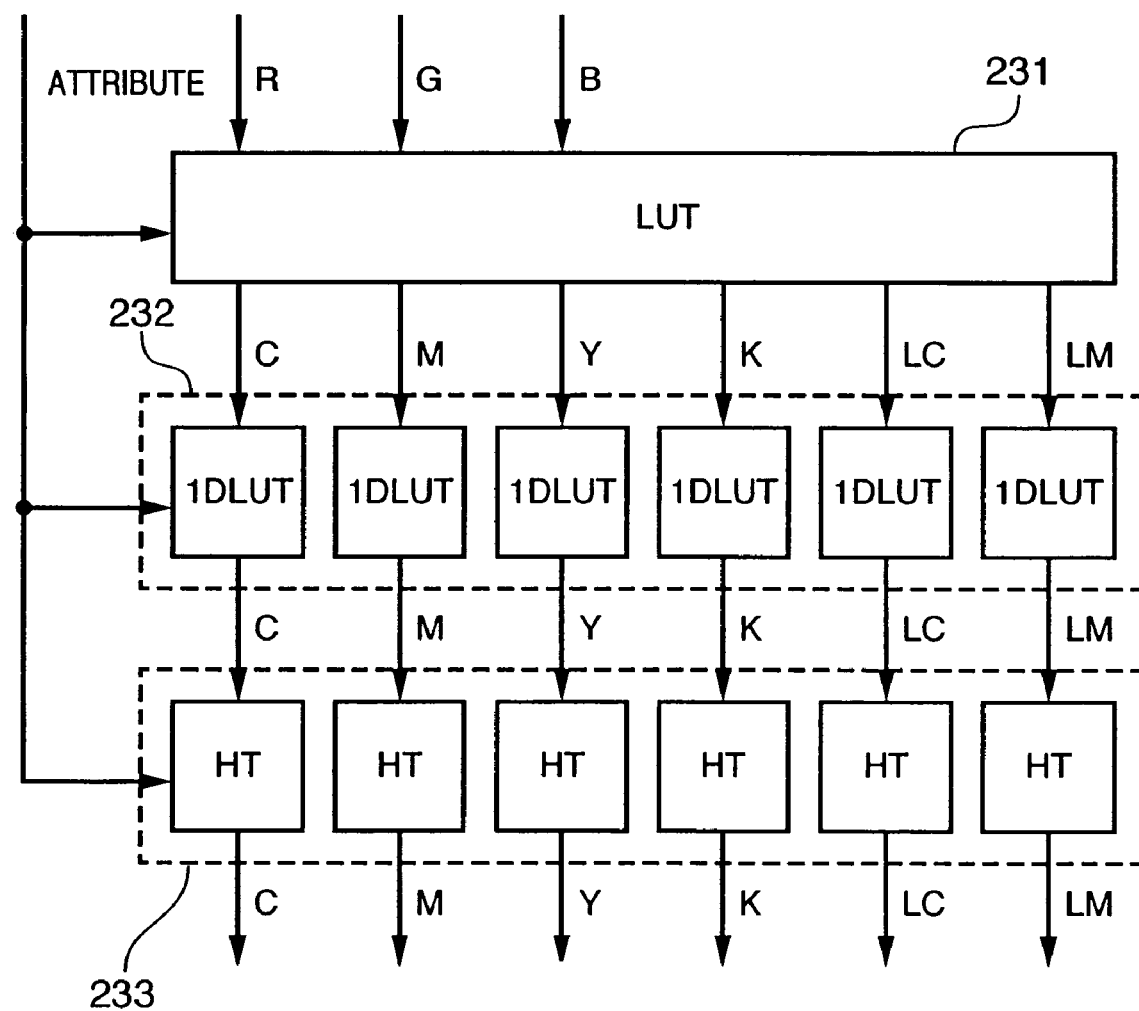
FIG. 7 is a block diagram to show a structure of the color converter of an apparatus using six-color toner.

As an example of handling color components of five or more colors, a structure of the color converter 215 of an apparatus using six-color toner is shown in FIG. 7.

In this case, the color converter 215 is composed of the three-input and six-output lookup table (LUT) 231 for color conversion, the one-input and one-output LUT 232 for gamma compensation and the LUT (HT) 233 for half-toning processing. Per pixel, and inputs an RGB bitmap image and outputs a CMYK, light-cyan (Lc) and light-magenta (Lm) bitmap image (attribute information). These LUTs can be switched according to pixel values of the attribute bitmap image. The LUT 231 is provided with three kinds, and the LUT 232 and the HT 233 are provided with three kinds for every color of CMYK.

[Printer Control Unit]

Figure 8:
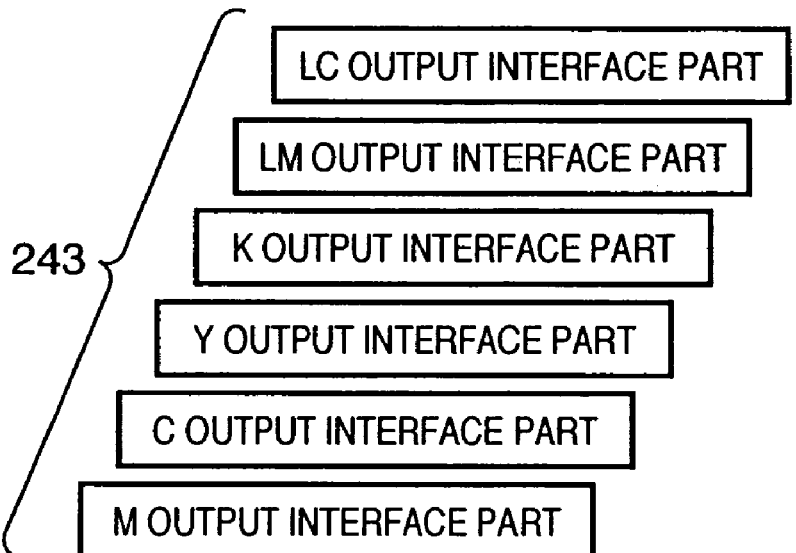
FIG. 8 is a block diagram to show a structure of a printer control unit.

FIG. 8 is a block diagram to show a structure of the printer control unit 101 in an embodiment. The structure before the page memory 213 is the same as that shown in FIG. 5, so that it is omitted.

After rendering of middle data for one page is completed and the rendered image is stored in the page memory 213, an expander 214 reads out the compressed image per several lines from the page memory 213 and then expands it. In this case, the drawing bitmap image and the attribute bitmap image are independently read out and then expanded.

The color converter 215 converts the expanded RGB 8 bits/pixel bitmap image into an LcLm 4 bits/pixel bitmap image. The LUT sets of the color converter 215 are set to a table to output Lc and Lm. In detail, the RGB 8 bits/pixel bitmap image is converted into an LcLm 10 bits/pixel bitmap image, and then gamma compensation is performed on the LcLm 10 bits/pixel bitmap image. After gamma compensation, half-toning processing is performed on the bitmap image to acquire an LcLm 4 bits/pixel bitmap image. The output of the LUT 231 shown in FIG. 7 is four colors, however, at the time of conversion to acquire LcLm, the output of the two remaining colors is ignored.

The color converter 215 switches color conversion methods corresponding to pixel values of an attribute bitmap image. Specifically, color conversion methods are switched based on 1 bit/pixel information, which indicates whether printing is performed with only K or colors mixed with YMCKLcLm, and then an RGB 8 bits/pixel bitmap image is converter into an LcLm 10 bits/pixel bitmap image. Subsequently, half-toning processing is switched based on 3 bits/pixel information, which indicates that each pixel constitutes either of character, figure and image, and then the LcLm 10 bits/pixel bitmap image is converted into an LcLm 4 bits/pixel bitmap image.

An engine synchronous memory 242 holds the Lc and Lm bitmap image for one page outputted from the color converter 215. The color converter 215 has the LUT structure of four colors shown in FIG. 6, so that the LUT structure of two colors is used if an Lc and Lm bitmap image is generated. Therefore, by ignoring the output from the LUT structure for other two colors (or setting an output signal value to zero), in the engine synchronous memory 242, the Lc and Lm bitmap image is stored in the engine synchronous memory 242.

Subsequently, the color converter 215 converts the expanded RGB 8 bits/pixel bitmap image into a YMCK 4 bits/pixel bitmap image. At this point, the LUT sets of the color converter 215 are changed to a table to output YMCK. In detail, an RGB 8 bits/pixel bitmap image is converted into a YMCK 10 bits/pixel bitmap image, and then gamma compensation is performed on the YMCK 10 bits/pixel bitmap image. After gamma compensation, half-toning processing is performed on the bitmap image to acquire a YMCK 4 bits/pixel bitmap image.

The color converter 215 switches color conversion methods corresponding to pixel values of an attribute bitmap image. Specifically, color conversion methods are switched based on 1 bit/pixel information, which indicates whether printing is performed with only K or colors mixed with YMCK, and then an RGB 8 bits/pixel bitmap image is converter into a YMCK 10 bits/pixel bitmap image. Subsequently, half-toning processing is switched based on 3 bits/pixel information, which indicates that each pixel constitutes either of character, figure and image, and then the YMCK 10 bits/pixel bitmap image is converter into a YMCK 4 bits/pixel bitmap image.

The engine synchronous memory 242 holds the YMCK bitmap image for one page outputted from the color converter 241. Therefore, the YMCKLcLm six-color bitmap image data for one page is held in the engine synchronous memory 242.

An output interface for six colors 243 converts the bitmap image held in the engine synchronous memory 242 into video signals to output it to the printing part 217.

Figure 9:
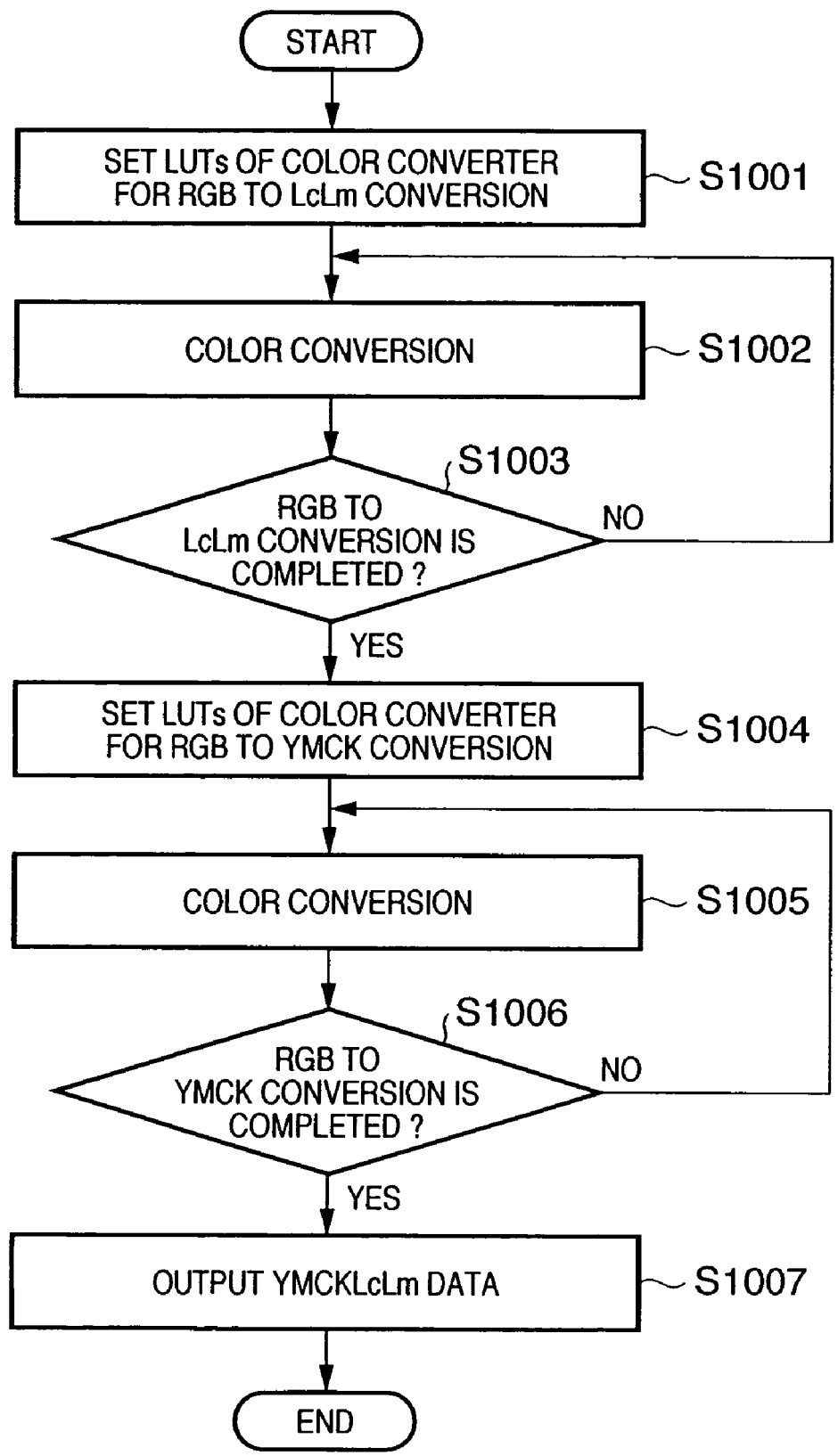
FIG. 9 is a flowchart to show color conversion processing.

FIG. 9 is a flowchart to show color conversion processing, which is executed per page by the CPU 208, in an embodiment.

When an image for one page is stored in the page memory 213, the tables of the LUT sets of the color converter 215 are set for Lc and Lm generation (S1001). Then, the color converter 215 performs color conversion for a bitmap image inputted from the expander 214, and the color-converted bitmap image is held in the engine synchronous buffer 242 (S1002). Subsequently, it is determined whether or not color conversion for all pixels is completed or RGB to LcLm conversion for one page is completed (S1003). If completed, the processing goes to step S1004. If not completed, the processing returns to step S1002.

If the RGB to LcLm conversion is completed, the tables of the LUT sets of the color converter 215 are set for YMCK generation (S1004). Then, the color converter 215 performs color conversion for a bitmap image inputted from the expander 214, and the color-converted bitmap image is held in the engine synchronous buffer 242 (S1005). Subsequently, it is determined whether or not color conversion for all pixels is completed or RGB to YMCK conversion for one page is completed (S1006). If completed, the processing goes to step S1007. If not completed, the processing returns to step S1005.

When the RGB to YMCK conversion is completed, the YMCKLcLm bitmap data for one page is held in the engine synchronous buffer 242, so that the data held in the engine synchronous buffer 242 is outputted to the output interface 243 (S1007).

As described above, by changing the structure and control for the printer control unit 101 a little, it is possible easily to correspond to the printing part 217 for six colors using the color converter 215 for four colors.

Alternatively, the reverse order to the above, that is, after performing the RGB to YMCK conversion, the RGB to LcLm conversion may also be performed.

In addition, the input to the printer control unit 101 is not limited to the data 218, such as page description language (PDL) data transmitted from the host computer 201, and may also be RGB data outputted from an image scanner like a copying machine.

In addition, a bitmap data to be inputted into the page memory 213 may also be image data stored or temporarily held in a storage device, such as a hard disc, connected to the printer control unit 101.

Furthermore, input color space of the color converter 215 is not limited to RGB, and if the color space of data outputted by the renderer 210 is that of YMCK, Lab or XYZ, the input color space of the color converter 215 may become YMCK, Lab or XYZ. If the color converter 215 inputs YMCK, the LUT 231 shown in FIG. 6 becomes a four-color-input and four-color-output LUT.

[Another Structure of Printer Control Unit]

Figure 10:
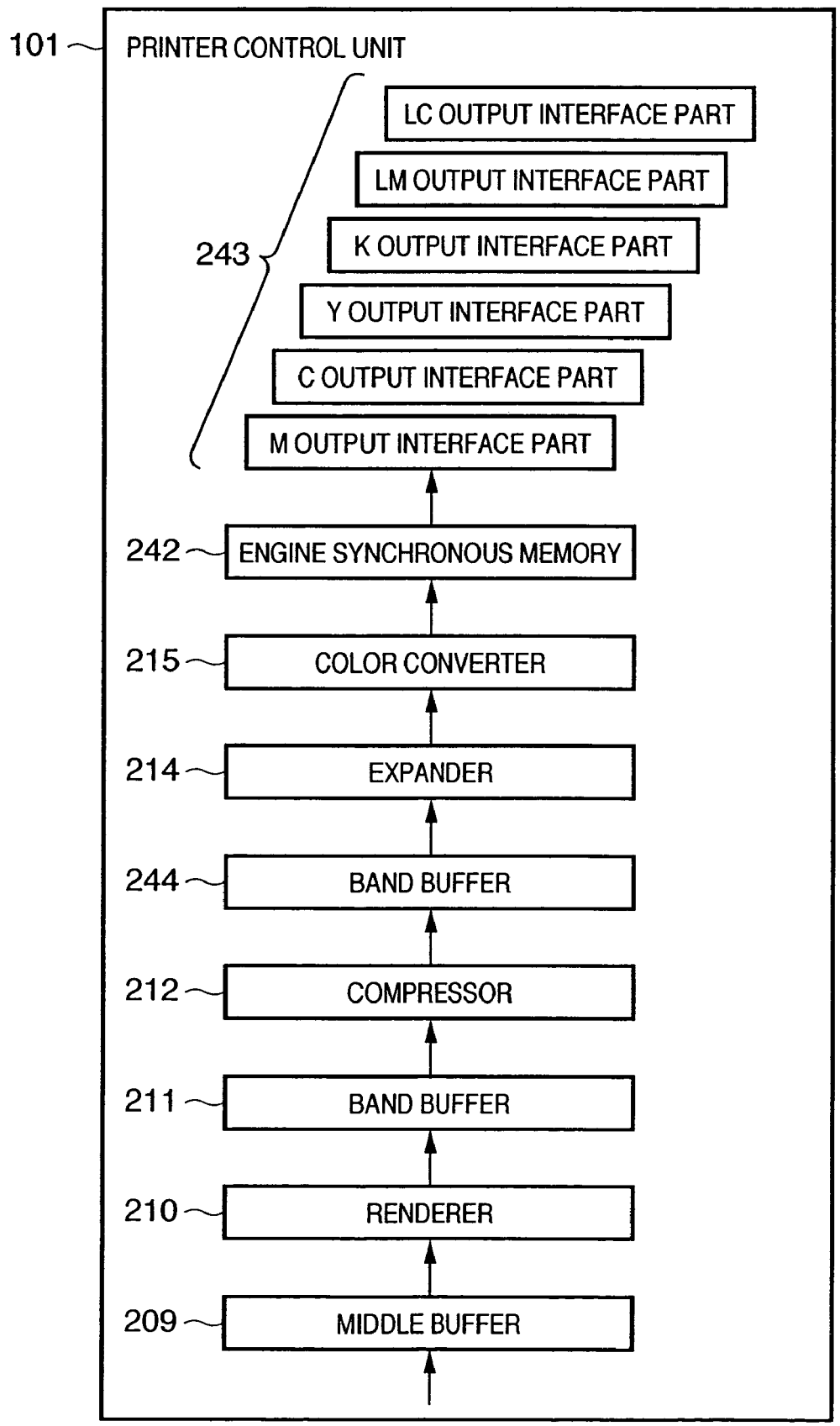
FIG. 10 is a block diagram to show another structure of a printer control unit.

FIG. 10 is a block diagram to show another structure of the printer control unit 101. The structure before the renderer 210 is the same as that of FIG. 5, so that it is omitted.

If middle data for one page is stored in the middle buffer 209, the renderer 210 renders the middle data band by band (each band being several lines) into an RGB drawing bitmap image, and generates an attribute bitmap image to store it in the band buffer 211. From then on, the RGB bitmap image and the attribute bitmap image are handled independently.

The compressor 211 compresses the bitmap image per band to store it in a compress buffer 244. The compress buffer 244 has a storage capacity, in which compressed data for at least one band can be stored. The expander 214 reads out compressed data for one band from the band buffer 244, and then expands it.

The color converter 215 converts the expanded RGB 8 bits/pixel bitmap image for one band into an LcLm 4 bits/pixel bitmap image.

As described above, the renderer 210, the band buffer 211, the compressor 212, the compress buffer 244, the expander 214 and the color converter 215 co-operate and converts the middle data into the LcLm bitmap image per band. Then, the LcLm bitmap image for one page can be stored in the engine synchronous memory 242. It is needless to mention that the co-operation is realized by control of the CPU 208.

Next, by the same co-operation, a YMCK bitmap image for one page is stored in the engine synchronous memory 242. At this point, since the YMCKLcLm bitmap data for one page is held in the engine synchronous buffer 242, the data held in the engine synchronous buffer 242 is outputted to the output interface 243.

In such a structure, using the color converter 215 for four colors, it is possible easily to correspond to the six-color printing part 217. Alternatively, the compressor 212, the compress buffer 244 and the expander 214 may also be omitted.

The input color space of the color converter 215 is not limited to RGB, and if the color space of data outputted by the renderer 210 is a color space, such as YMCK, Lab or XYZ, the input color space of the color converter 215 becomes YMCK, Lab or XYZ. If the color converter 215 inputs YMCK, the LUT 231 shown in FIG. 6 becomes a four-color-input and four-color output LUT.

[Modification Example]

In the above, an example of holding YMCKLcLm data for one page in the engine synchronous memory 242 was explained. However, by synchronizing output from the color converter 215 with image forming of the printing part 217, memory for at least on color can be saved.

Figure 3:
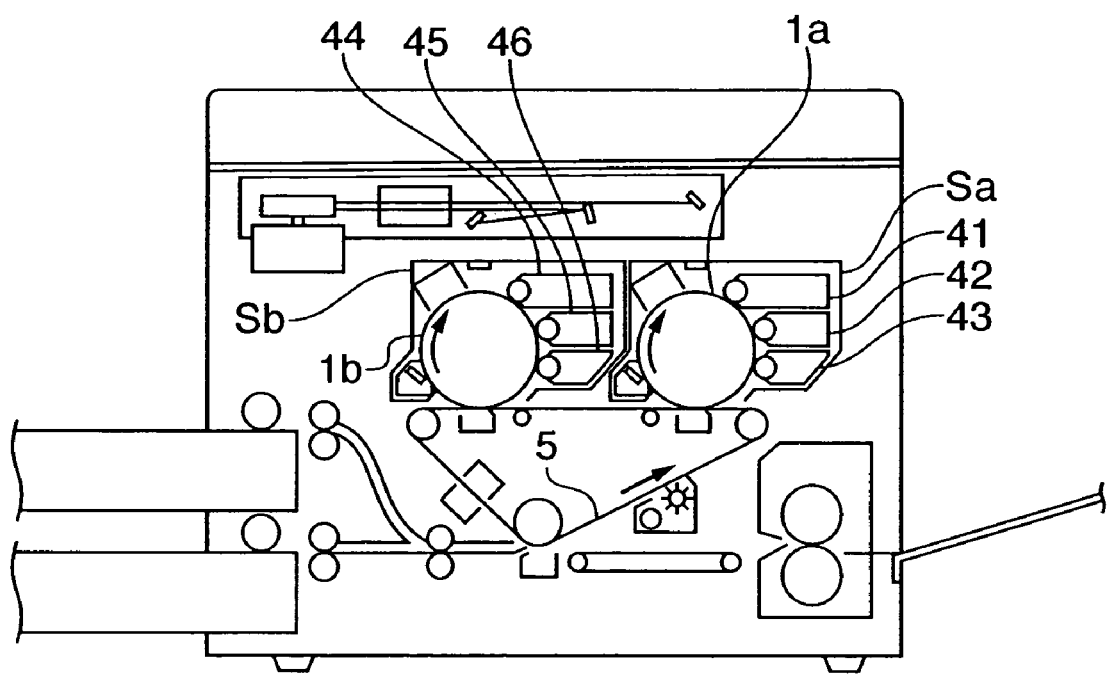
Figure 11:
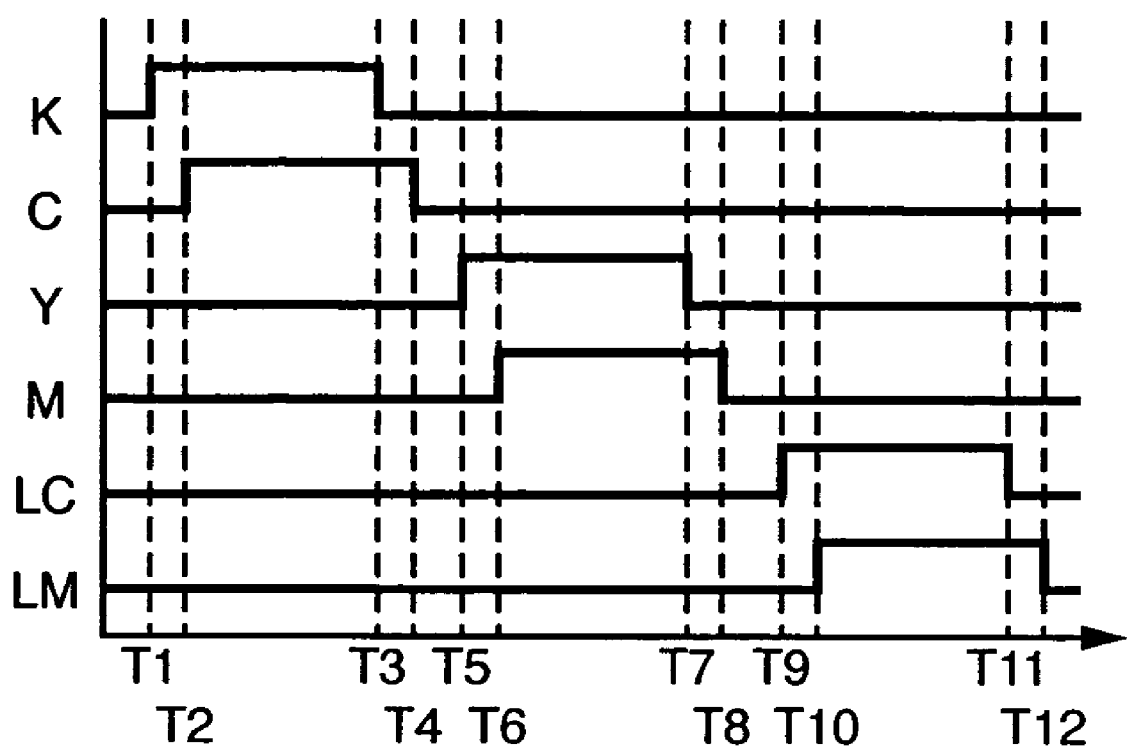
FIG. 11 shows the timing to output video signals from an output interface to a printing part.

FIG. 11 shows the timing to output video signals from the output interface 243 to the printing part 217 in the case of the embodiment, in which the printing part 217 has two image forming parts shown in FIG. 3.

As shown in FIG. 11, the output interface 243 begins the output of K video signal at a timing T1, and ends at a timing T3. Similarly, the output interface 243 begins the outputs of C, Y, M, Lc and Lm video signals at timings of T2, T3, T6 and T9 respectively.

At this point, the intervals between the timings T1 and T2, T5 and T6, and T9 and T10 correspond to the time, for which one point on the middle transfer belt 5 moves between the photosensitive drums 1a and 1b, and the intervals between T1 and T5, and T5 and T9 correspond to the time, for which the middle transfer belt 5 turns one round. Therefore, at step S1005 shown in FIG. 9, RGB to YMCK conversion is performed, and bitmap images of colors other than black are stored in the engine synchronous memory 242. Without storing a bitmap image of black, it is transmitted to the output interface 243 and then converted into K video signal to be transmitted to the printing part 217.

As described above, if the output from the color converter 215 is synchronized with image forming of the engine part 217, memory for one color in the engine synchronous memory 242 can be saved.

Furthermore, if the number of gradations for each color plane is reduced from 4 bits/pixel to 2 bits/pixel, storage capacity of the engine synchronous memory 242 can be reduced.

In addition, the resolution of a color (black) plane, which synchronizes with image forming of the printing part 217, is set to a value, i.e., 1200 dpi, and the resolution of a color plane to be stored in the engine synchronous memory 242 may also be lowered, i.e., from 1200 dpi to 600 dpi. Thereby, storage capacity required in the engine synchronous memory 242 is reduced, and characters, line drawings and figures, which are required with high resolution, can clearly be printed at a high resolution. In addition, photograph images and others, in which good gradation is required rather than resolution, can also be printed with high gradation.

In the above-description, an example, in which storage capacity of the engine synchronous memory 242 is reduced by lowering the resolution or the gradation of a color plane to be stored in the engine synchronous memory 242 was explained. Alternatively, only information of color components, such as light magenta or light cyan, the fall of the amount of information of which is not conspicuous in reducing resolution or gradation, may also be reduced.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   a converter, arranged to color-convert image data composed of three-color components into image data composed of four-color components at the same time; and
   a controller, arranged to make said converter perform color conversions and hold its color conversion result in a memory so as to generate image data composed of five or more color components,
   wherein said controller sets a table for first color conversion to said converter to convert image data composed of the three-color components into image data composed of the four-color components and makes said converter perform the first color conversion, and sets another table for second color conversion to said converter to convert the image data composed of the three-color components into image data composed of at least one color component except for the four-color components in the five or more color components and makes said converter perform the second color conversion.

2. The apparatus according to claim 1, wherein said controller makes said converter execute the first color conversion and then execute the second color conversion.

3. The apparatus according to claim 1, wherein said controller makes said converter execute the second color conversion and then execute the first color conversion.

4. The apparatus according to claim 1, wherein the five or more color components are six-color components.

5. The apparatus according to claim 4, wherein the four-color components are cyan, magenta, yellow and black, and the color components expect for the four-color components are light cyan and light magenta.

6. The apparatus according to claim 1, wherein said converter performs the color conversion synchronizing with image formation of a printer engine.

7. An image processing method of an image processing apparatus having a converter arranged to color-convert image data composed of three-color components into image data composed of four color components at the same time, the method comprising the steps of:
   controlling the converter to execute color conversions; and
   holding color conversion results of the converter in memory to generate image data composed of five or more color components,
   wherein the controlling step includes setting a table for first color conversion to the converter to convert image data composed of the three-color components into image data composed of the four-color components and making the converter perform the first color conversion, and setting another table for second color conversion to the converter to convert the image data composed of the three-color components into image data composed of at least one color component expect for the four-color components in the five or more color components and making the converter perform the second color conversion.

8. A computer-readable medium storing, in executable for, a program comprising program code for causing an image processing apparatus, which has a converter arranged to color-convert image data composed of three color components into image data composed of four color components at the same time, to perform an image processing method, the method comprising the steps of:

controlling the converter to execute color conversions; and holding color conversion results of the converter in memory to generate image data composed of five or more color components, wherein the controlling step includes setting a table for first color conversion to the converter to convert image data composed of the three-color components into image data composed of the four-color components and making the converter perform the first color conversion, and setting another table for second color conversion to the converter to convert the image data composed of the three-color components into image data composed of at least one color component expect for the four color components in the five or more color components and making the converter perform the second color conversion.

* * * * *

UNITED STATES PATENT AND TRADEMARK OFFICE
CERTIFICATE OF CORRECTION

PATENT NO. : 7,426,294 B2
APPLICATION NO. : 10/779688
DATED : September 16, 2008
INVENTOR(S) : Joji Oki It is certified that error appears in the above-identified patent and that said Letters Patent is hereby corrected as shown below:

<u>COLUMN 1</u>

Line 24, "in" should read --of--.

<u>COLUMN 2</u>

Line 5, "is" should be deleted; and
    Line 34, "arrange" should read --arranged--.

<u>COLUMN 5</u>

Line 5, "verter" should read --verted--;
    Line 9, "converter" should read --converted--; and
    Line 52, "processing. Per" should read --processing per--.

<u>COLUMN 6</u>

Line 23, "converter" should read --converted--;
    Line 54, "verter" should read --verted--; and
    Line 58, "converter" should read --converted--.

<u>COLUMN 8</u>

Line 6, "converts" should read --convert--; and
    Line 32, "on color" should read --one color--.

<u>COLUMN 10</u>

Line 41, "expect" should read --except--;
    Line 49, "four color" should read --four-color--; and
    Line 64, "expect" should read --except--.

<u>COLUMN 11</u>

Line 1, "for," should read --form,--.

UNITED STATES PATENT AND TRADEMARK OFFICE
CERTIFICATE OF CORRECTION

PATENT NO. : 7,426,294 B2
APPLICATION NO. : 10/779688
DATED : September 16, 2008
INVENTOR(S) : Joji Oki It is certified that error appears in the above-identified patent and that said Letters Patent is hereby corrected as shown below:

<u>COLUMN 12</u>

Line 7, "expect" should read --except--.

Signed and Sealed this

Seventeenth Day of February, 2009

JOHN DOLL
*Acting Director of the United States Patent and Trademark Office*